(12) United States Patent
Becker et al.

(10) Patent No.: US 8,262,966 B2
(45) Date of Patent: Sep. 11, 2012

(54) PROCESS FOR COOLING FLAT PLASTIC PRODUCTS

(75) Inventors: Klaus Becker, Löhne (DE); Michael Käthler, Bielefeld (DE)

(73) Assignee: Battenfeld-Cincinnati Germany GmbH, Bad Oeynhausen (DE)

( * ) Notice: Subject to any disclaimer, the term of this patent is extended or adjusted under 35 U.S.C. 154(b) by 225 days.

(21) Appl. No.: 12/612,989

(22) Filed: Nov. 5, 2009

(65) Prior Publication Data
US 2010/0109180 A1 May 6, 2010

(30) Foreign Application Priority Data
Nov. 6, 2008 (DE) .................. 10 2008 043 536

(51) Int. Cl.
*B29C 53/18* (2006.01)
*B29C 53/84* (2006.01)
(52) U.S. Cl. ........................ 264/237; 264/175
(58) Field of Classification Search ........... 264/237, 264/175; 425/335, 367
See application file for complete search history.

(56) References Cited

U.S. PATENT DOCUMENTS

| | | | |
|---|---|---|---|
| 4,105,386 A | 8/1978 | Thiel et al. | |
| 5,262,101 A * | 11/1993 | Yagi et al. | 264/410 |
| 6,872,342 B2 * | 3/2005 | Giachetto et al. | 264/167 |
| 2002/0027309 A1 * | 3/2002 | Fujii et al. | 264/210.2 |
| 2002/0041056 A1 | 4/2002 | Nissel | |
| 2002/0070478 A1 * | 6/2002 | Nissel | 264/211.12 |
| 2004/0012109 A1 * | 1/2004 | Brossman | 264/40.5 |
| 2005/0263939 A1 | 12/2005 | Krampf et al. | |

FOREIGN PATENT DOCUMENTS

| | | |
|---|---|---|
| DE | 1957708 A1 | 5/1971 |
| DE | 3802095 A1 | 8/1989 |
| DE | 102006012417 A1 | 9/2007 |
| EP | 1 382 432 A2 | 1/2004 |
| EP | 1 600 277 A2 | 11/2005 |
| JP | H08-230018 * | 2/1995 |

* cited by examiner

*Primary Examiner* — Joseph Del Sole
*Assistant Examiner* — Kimberly A Stewart
(74) *Attorney, Agent, or Firm* — Hamilton, Brook, Smith & Reynolds, P.C.

(57) ABSTRACT

Method for cooling flat plastic products, in which plasticized plastic compound is fed to a calender via a slot nozzle by means of an extruder and is rolled and calibrated to the desired shape in this calender between at least two smoothing rolls, after which the film or sheet produced in this way is fed to a chill section comprising a plurality of adjustable rolls and passes through this section until it is sufficiently cool and dimensionally stable, at least both the gap width between the rolls and the speed of the rolls being controllable by open- and/or closed-loop control.

The degree of wrap of the flat plastic product around the respective roll is varied by adjusting the rolls in the chill section into a mutually offset arrangement, hence increasing or minimizing the cooling capacity.

11 Claims, 4 Drawing Sheets

PROCESS FOR COOLING FLAT PLASTIC PRODUCTS

RELATED APPLICATION

This application claims priority under 35 U.S.C. §119 or 365 to German Application No. 10 2008 043 536.8, filed Nov. 6, 2008. The entire teachings of the above application are incorporated herein by reference.

BACKGROUND

The invention relates to a method for cooling flat plastic products, in which plasticized plastic compound is fed to a calender via a slot nozzle by means of an extruder and is rolled and calibrated to the desired shape in this calender between at least two smoothing rolls, after which the film or sheet produced in this way is fed to a chill section comprising a plurality of adjustable rolls and passes through this section until it is sufficiently cool and dimensionally stable, at least both the gap width between the rolls and the speed of the rolls being controllable by open- and/or closed-loop control.

Calenders of this kind are known from the prior art. For this purpose, EP 1 600 277 A2 describes an apparatus for calibrating and cooling a plastic film or plastic sheet comprising at least two chill or calibrating rolls, a chill section being arranged downstream of the rolls. According to the invention, the downstream chill section comprises pairs of rolls arranged one behind the other.

In chill sections of this kind, it is true that the position of the rolls can be adjusted, thereby allowing the cooling capacity to be influenced. However, it has been found that, as the rolls are adjusted, the film passing through partially loses contact with the roll, thereby giving rise to differences in the cooling behavior of the film.

SUMMARY

It is therefore the object of the invention to propose a method in which this disadvantage can be avoided and the flat plastic product is cooled in an optimum manner.

The way in which the object is achieved is characterized in conjunction with the precharacterizing clause of a method for cooling flat plastic products, comprising feeding plasticized plastic compound to a calender via a slot nozzle by means of an extruder and which is rolled and calibrated to a desired shape in the calender between at least two smoothing rolls, after which a film or sheet produced in this way is fed to a chill section comprising a plurality of adjustable rolls and passes through the section until it is sufficiently cool and dimensionally stable, at least both a gap width between the rolls and speed of the rolls being controllable by open- and/or closed control, by the fact that the degree of wrap of the flat plastic product around the respective roll is varied by adjusting the rolls in the chill section into a mutually offset arrangement, hence increasing or minimizing the cooling capacity, the gap width, once specified, being held constant during each adjustment operation by means of an appropriate control system.

The method thus aims to ensure that, while the cooling behavior can be varied by adjusting the rolls in their geometrical position, the control system is configured in such a way that geometrical relationships within the chill section, once defined, are retained.

According to a development, a positioning roll presses the flat plastic product against one of the smoothing rolls, the positioning roll being moved in a rotatory motion around the smoothing roll while maintaining a predetermined spacing relative to this smoothing roll. This positioning roll defines the point of separation of the flat plastic product from the smoothing roll, in particular the top roll. The position of this positioning roll relative to the smoothing roll furthermore defines the length of contact and hence the contact area with the smoothing rolls and thus also the cooling behavior. This positioning roll is followed by all the adjustable rolls of the chill unit, the spacing of which is defined, as already described above. It is not absolutely mandatory here that the spacing between two pairs of rolls in each case should be constant over the entire chill section. It is perfectly conceivable that this spacing should become smaller towards the end of the chill section owing to the cooling behavior of the flat plastic product.

In a further development, the center lines of the rolls of the chill section are held parallel to one another during the adjustment operation. This stipulation ensures that the spacing between the rolls, once set, remains constant over the entire width of the roll.

According to a development, the center lines of two adjacent rolls furthermore define a geometric plane, the planes thus defined rotating in each case about one of the center lines, and the spacing between the center lines of the adjacent rolls remaining constant during the adjustment operation. The planes thus defined between the respective center lines can be compared with the bellows of an accordion, the folds of which unfold further in relation to one another as they are pulled open but retain a predetermined position in themselves owing to their being fixed at the edges of the bends.

According to a development, the positioning roll and the adjoining chill rolls are furthermore adjusted synchronously. Thus if the position of the positioning roll relative to the smoothing roll is varied, all the adjustable rolls of the chill unit follow synchronously while retaining the predetermined spacing relative to one another.

According to a development, the control system of the plant is configured in such a way that, as a function of a specified value, the required further parameters—the roll spacing, degree of wrap, gap dimension or chill contact area being referred to here, for example—are varied automatically along with it. This has the advantage that the machine operator has only to perform a very small number of inputs to the control system and the remaining values adapt automatically thereto within the entire chill section.

Thus, for example, it is advantageously possible to specify only the gap width, and all the rolls in the chill section are automatically and synchronously adjusted with respect to it.

Since, in the method according to the invention, a large number of process parameters change automatically in accordance with a particular mathematical model, a collision with the chill apparatus during the adjustment of the rolls is monitored within the said chill apparatus.

Simple initiation of adjustment and hence variation of the contact areas is achieved by one-touch operation. The collision monitoring facility described above with reference to the chill apparatus frame also comprises a facility for monitoring collision between the positioning roll and the downstream chill rolls.

The open-loop control of the plant proposed in this method can furthermore have closed-loop aspects, temperature measurement of the flat plastic product by means of a contactless infrared sensor or measurement of the color of the film surface being in mind here, for example. It is likewise also possible to integrate a gloss measurement facility. By means of these measurement parameters it is possible to implement automatic setting, control or optimization of the chill contact area as a function of the surface temperature. It is also possible for the color measurement or the gloss measurement to be used as the dependent parameter.

The proposal is thus to influence the chill section automatically as a function of the measurement results and, as described above, to position the adjustable rolls, it being possible to make use of the measured values singly or in some combination.

By means of the open-loop and closed-loop control, it is also possible to implement optimization of the machine operating point, i.e. the discharge rate of the extruder or the production rate as a function of the temperature, color and gloss measurement. It would of course likewise be conceivable to influence the cooling capacity of the individual roll modules as a function of these measured values by increasing or minimizing the temperature of the individual rolls since these rolls are provided with temperature control. The chill roll temperature can be varied by adjusting the temperature profile by changing the temperature gradient. In this case, it is proposed to arrange a plurality of measuring points within the chill section.

It is thus furthermore proposed according to the invention, in conjunction with the precharacterizing clause of a method for cooling flat plastic products, comprising feeding plasticized plastic compound to a calender via a slot nozzle by means of an extruder and which is rolled and calibrated to a desired shape in the calender between at least two smoothing rolls, after which a film or sheet produced in this way is fed to a chill section comprising a plurality of adjustable rolls and passes hg until it is sufficiently cool and dimensionally stable, at least both a gap width between the rolls and speed of the rolls being controllable by open- and/or closed-loop control, to vary the discharge rate and/or the production rate of the extruder and/or the cooling capacity of the rolls automatically as a function of the measured temperature and/or of the color and/or of the gloss of the flat plastic product produced.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

An exemplary embodiment of the invention is shown schematically in the drawings, in which.

DETAILED DESCRIPTION

A description of example embodiments of the invention follows.

Figure 1:
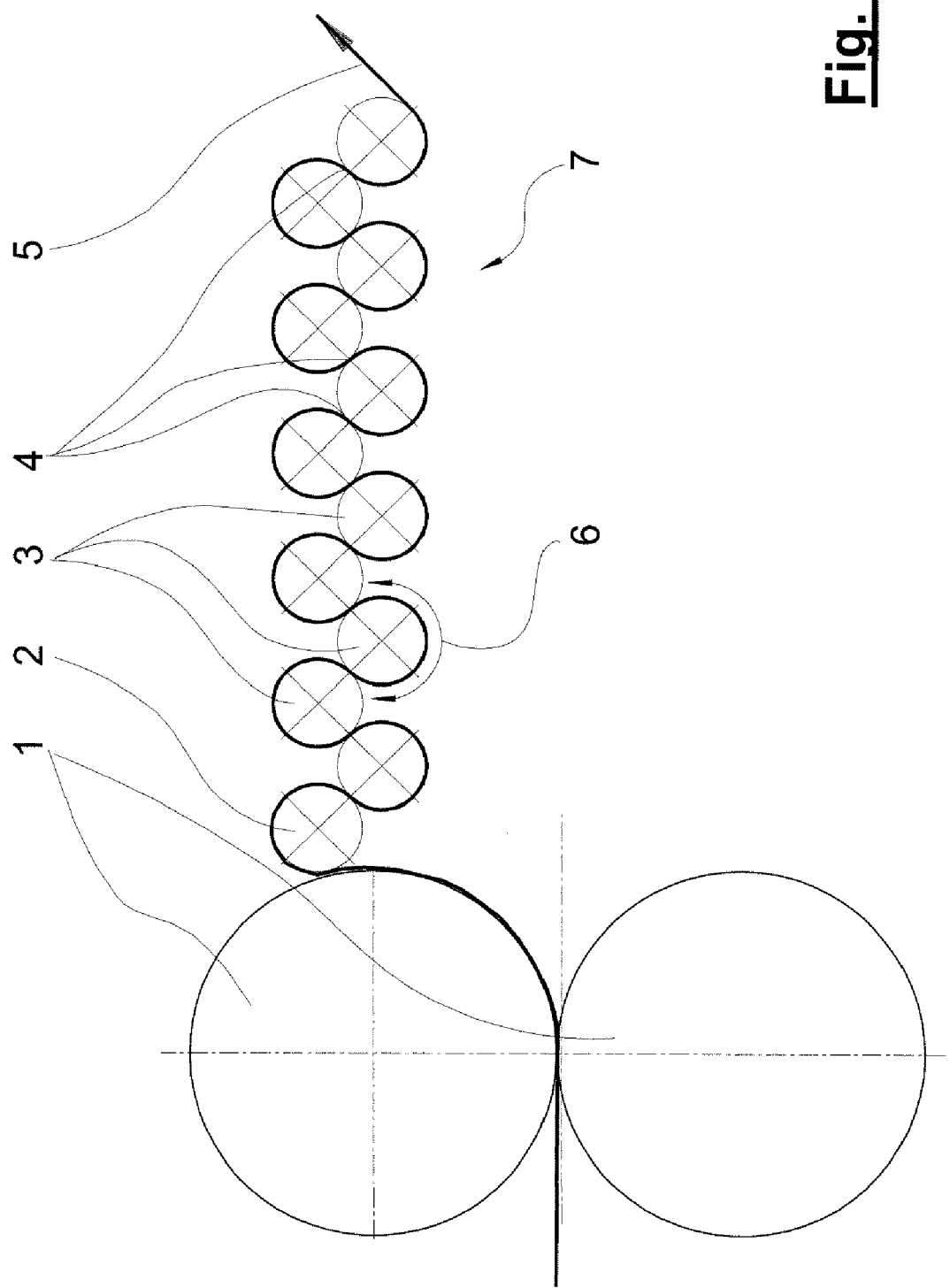
FIG. 1 shows a section through a smoothing and chill section, FIG. 2 corresponds to FIG. 1 with the chill rolls in a different position.

The calender with the chill section arrangement is shown schematically in FIG. 1. It shows a longitudinal section through all the rolls, the extruder and the sheet die (neither of these being shown) being situated ahead of this calender, on the left hand side in the figure, and a wind-up system for the film produced in this way (not shown either) being situated to the right of the figure. Thus the film comes to the two smoothing rolls 1 from the left from the sheet die, is guided with a predetermined spacing to the top smoothing roll 1 by means of the positioning roll 2, the positioning roll 2 being rotatable about the center line of the top smoothing roll 1, along the radius to be rotated around the latter, and thus determines the point of separation of the film from the top smoothing roll 1. The film is guided around the positioning roll 2 and around all the subsequent adjustable rolls 3 and leaves the chill section in the direction of the arrow, and can be wound onto a film winder (not shown). Between each adjacent movable roll 3 there is defined a gap dimension 4, although this does not have to be identical across all the adjustable rolls 3. All the rolls 3 arranged in series form the chill section 7. The setting of the rolls 3 relative to one another defines the magnitude of the degree of wrap 6 of the film around each roll 3.

If the positioning roll 2 is now guided upwards along the circumference of the top smoothing roll 1, at a constant spacing relative to the latter, the adjustable rolls 3 must follow this movement synchronously and distance themselves from the smoothing rolls 1 to ensure that the predetermined gap dimension 4 relative to the rolls remains constant in each case.

The center lines of the rolls 2 and 3 form a plane between two adjacent rolls. In FIG. 1, this plane is depicted as a line between the respective center lines owing to the sectional view, these center lines appearing as center points in the circular representation. When the rolls 3 are adjusted, the control system is used to ensure that the spacing relative to the axes remains constant at all times but the angle of the respective planes is variable, which means, with respect to the two-dimensional representation in FIG. 1, that the lines connecting the center points of the rolls 2 and 3 remain constant in length but are variable in terms of their angle relative to one another.

Figure 2:
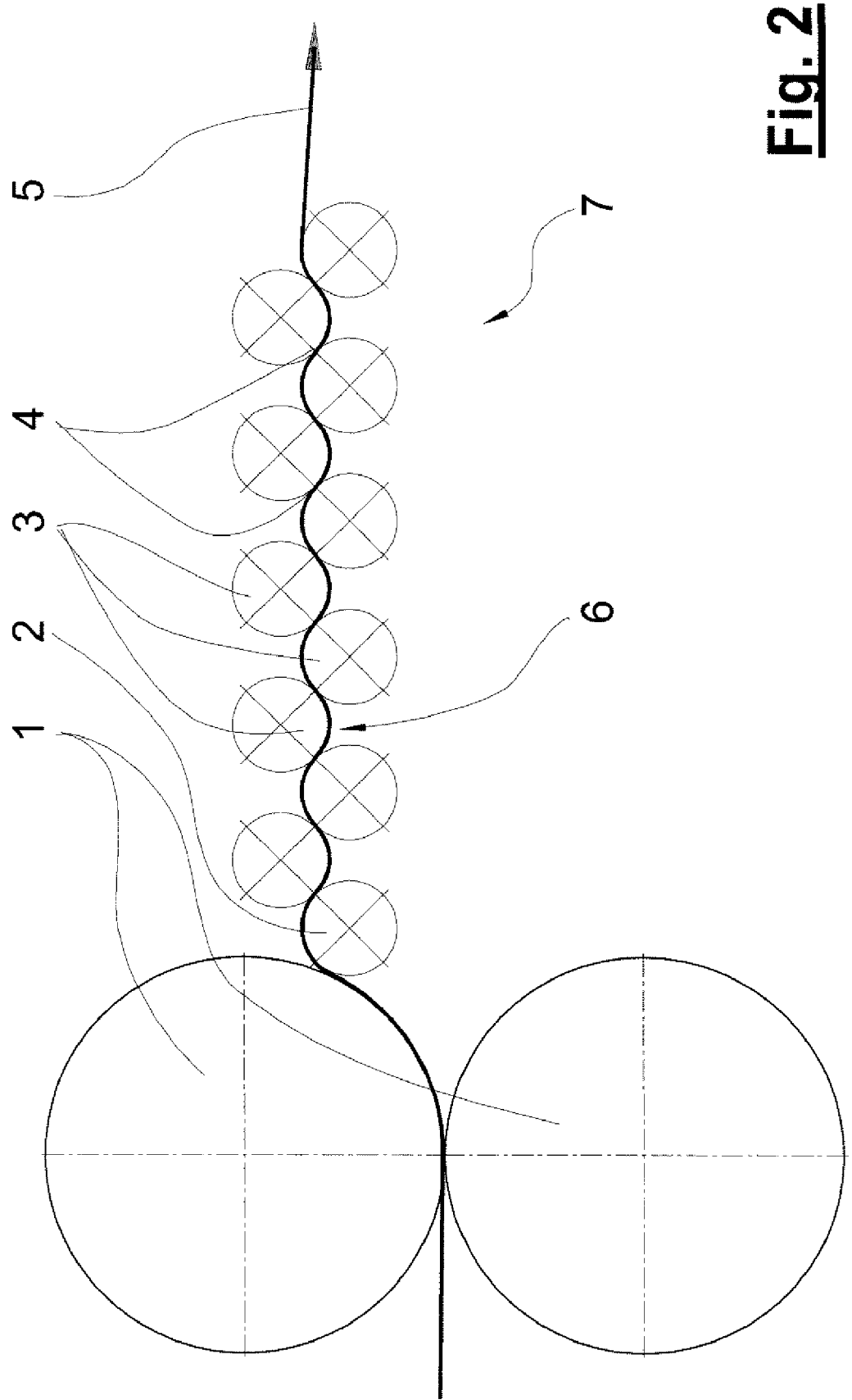

FIG. 2 corresponds essentially to FIG. 1, except that the positioning roll 2 and the adjustable rolls 3 are below the center line of the top smoothing roll 1. It is thus possible to achieve a very wide range around the center line of the top smoothing roll 1.

It is even possible to achieve a setting in which the position of the positioning roll 2, followed by the movable rolls 3, lies in a horizontal plane and the entire roll arrangement lies in the plane of the center line of the top smoothing roll 1, and this leads to impressive results. In a section similar to that in FIGS. 1 and 2, all the rolls would then lie with their center point on the same straight line. With such a setting, the film would then rest against the top smoothing roll 1 over 90° and rest against the positioning and movable rolls 2 and 3 over 180° in each case.

Figure 3:
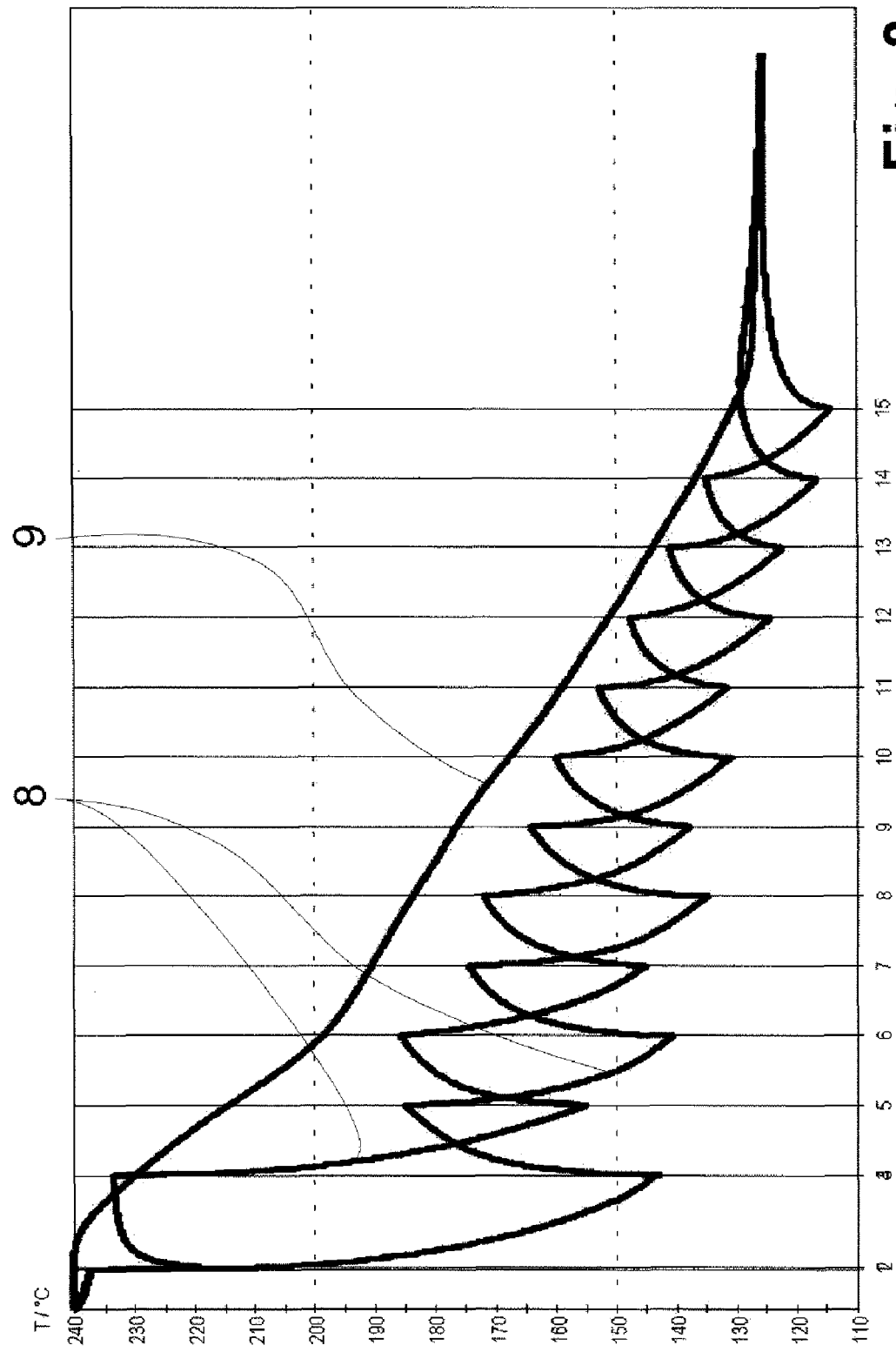
FIG. 3 shows the cooling behavior of the film in the chill roll position of FIG. 2.

FIG. 3 shows the temperature profile of the surface temperature of the smoothed film, each of the two curves 8 representing one surface of the film 5. This makes clear that the temperature of the surface of the film rises as soon as it loses contact with the chill roll and the other side of the film is cooled. This gives rise to a zigzag line, the averaged value of which is represented by the curve 9. The temperature profile shown in FIG. 3 corresponds approximately to the roll setting shown in FIG. 2.

Figure 4:
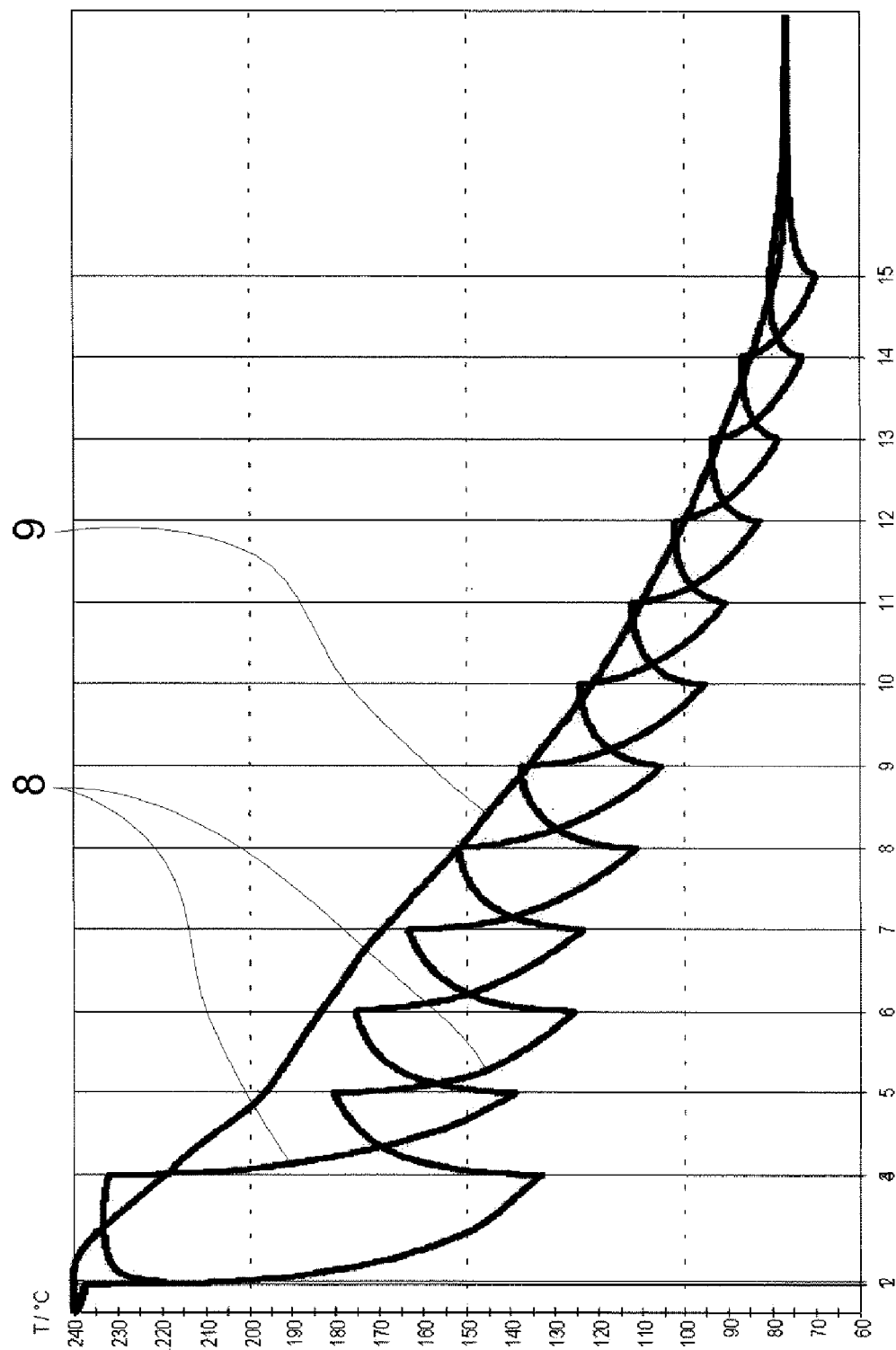
FIG. 4 shows the cooling behavior of the film in the chill roll setting of FIG. 3.

Like FIG. 3, FIG. 4 likewise shows the temperature profile, the curves 8 again representing the temperature of the two surfaces of the film 5, and the curve 9 representing the averaged value. The temperature profile shown in FIG. 4 corresponds approximately to the roll setting shown in FIG. 1. Comparing FIGS. 3 and 4, it is apparent that a significantly greater temperature gradient is achieved over the chill section if the roll setting shown in FIG. 1 is chosen since, in this case, a significantly greater contact area with the chill rolls is achieved in comparison with FIG. 2. The film is in contact even with the top smoothing roll 1 over about 115°, and the degree of wrap around the respective roll 3 or 2 is about 240°.

In combination with the temperature profile, the two illustrative examples show clearly that a significantly greater cooling capacity can be achieved with the same cooling capacity within the rolls 3, an identical construction of the rolls 3 and the same surface properties of the rolls 3, at the same take-off speed and, of course, with the same material, simply through the setting of the rolls 3 relative to one another. Since different settings are required, depending on the plastic material used and the desired gloss etc., the method according to the invention allows very simple adaptation since the selection of just one parameter in the control system is used to set all the other parameters as a function of it, and the control system adjusts all the rolls automatically and synchronously to match.

List of references:

| | |
|---|---|
| 1 | Smoothing roll |
| 2 | Positioning roll |
| 3 | Adjustable roll |
| 4 | Gap width |
| 5 | Flat plastic product |
| 6 | Degree of wrap |
| 7 | Chill section |
| 8 | Temperature profile of the surface temperature of 5 |
| 9 | Averaged value of 8 |

While this invention has been particularly shown and described with references to example embodiments thereof, it will be understood by those skilled in the art that various changes in form and details may be made therein without departing from the scope of the invention encompassed by the appended claims.

What is claimed is:

1. A method for cooling flat plastic products, comprising feeding plasticized plastic compound to a calender via a slot nozzle by means of an extruder and which is rolled and calibrated to a desired shape in the calender between at least two, top and bottom, smoothing rolls, after which a film or sheet produced in this way is fed to a chill section comprising a plurality of adjustable rolls and passes through the chill section until it is sufficiently cool and dimensionally stable, the chill section being in general alignment with a central region of one of the smoothing rolls, one of the rolls of the chill section pressing the flat plastic product against said one of the smoothing rolls, at least both a gap width between the rolls and speed of the rolls of the chill section being controllable by open- and/or closed-loop control, degree of wrap of the flat plastic product around a respective roll is varied by adjusting the rolls in the chill section into a mutually offset arrangement, hence increasing or minimizing cooling capacity, the gap width between mating rolls of the chill section, once specified, being held constant during an adjustment operation of the rolls of the chill section by means of an appropriate control system, whereby center axis lines of the plurality of rolls of the chill section are held parallel to one another, constant spacing is maintained between the center axis lines of each two adjacent mating rolls of the plurality of rolls of the chill section, the center axis lines of said each two adjacent mating rolls define a geometric plane, each plane thus defined being rotatable in each case about one of the center axis lines during said adjustment operation of the rolls, thereby varying an angle between adjacent geometric planes, while being in a bellows type configuration, where the planes are folds capable of unfolding relative to each other while pulled open but being connected at respective edges.

2. The method of claim 1 further comprising pressing with a positioning roll the flat plastic product against one of the smoothing rolls, the positioning roll being moved in a rotatory motion around the smoothing roll while maintaining a predetermined spacing relative to this smoothing roll.

3. The method of claim 2 further comprising adjusting the positioning roll and the chill rolls synchronously.

4. The method of claim 1 further comprising automatically varying at least one of the following required parameters, chill section roll spacing, and degree of wrap or chill contact areas, as a function of a specified value.

5. The method of claim 1 further comprising adjusting all the rolls of the chill section automatically and synchronously as a function of input gap width.

6. The method of claim 1 further comprising monitoring collision with a chill apparatus frame during adjustment of the rolls.

7. The method of claim 1 further comprising automatically adjusting the rolls of the chill section as a function of a measurement on the flat plastic product produced.

8. The method of claim 7 further comprising automatically adjusting the rolls of the chill section as a function of measured temperature of the film surface.

9. The method of claim 7, further comprising automatically adjusting the rolls of the chill section as a function of color and/or gloss measurement.

10. A method for cooling flat plastic products, comprising feeding plasticized plastic compound to a calender via a slot nozzle by means of an extruder and which is rolled and calibrated to a desired shape in the calender between at least two, top and bottom, smoothing rolls, after which a film or sheet produced in this way is fed to a chill section comprising a plurality of adjustable rolls and passes through the chill section until it is sufficiently cool and dimensionally stable, the chill section being in general alignment with a central region of one of the smoothing rolls, one of the rolls of the chill section pressing the flat plastic product against said one of the smoothing rolls, at least both a gap width between the rolls and speed of the rolls of the chill section being controllable by open- and/or closed-loop control, discharge rate and/or production rate of the extruder are adjusted automatically as a function of measured temperature and/or of color and/or of gloss of flat plastic product produced, once said gap width between mating rolls of the chill section is specified and held constant, the rolls of the chill section being adjustable during an adjustment operation by holding center axis lines of the plurality of rolls of the chill section parallel to one another, constant spacing being maintained between the center axis lines of each two adjacent mating rolls of the plurality of rolls of the chill section, the center axis lines of said each two adjacent mating rolls defining a geometric plane, each plane thus defined being rotatable in each case about one of the center axis lines during said adjustment operation of the rolls, thereby varying an angle between adjacent geometric planes, while being in a bellows type configuration, where the planes are folds capable of unfolding relative to each other while pulled open but being connected at respective edges.

11. A method for cooling flat plastic products, comprising feeding plasticized plastic compound to a calender via a slot nozzle by means of an extruder and which is rolled and calibrated to a desired shape in the calender between at least two, top and bottom, smoothing rolls, after which a film or sheet produced in this way is fed to a chill section comprising a plurality of adjustable rolls and passes through the chill section until it is sufficiently cool and dimensionally stable, the chill section being in general alignment with a central region of one of the smoothing rolls, one of the rolls of the chill section pressing the flat plastic product against said one of the smoothing rolls, at least both a gap width between the rolls and speed of the rolls of the chill section being controllable by open- and/or closed-loop control, cooling capacity of the rolls is adapted automatically as a function of measured temperature and/or of color and/or of gloss of the flat plastic product produced, once said gap width between mating rolls of the chill section is specified and held constant, the rolls of the chill section being adjustable during an adjustment operation by holding center axis lines of the plurality of rolls of the chill section parallel to one another, constant spacing being maintained between the center axis lines of each two adjacent mating rolls of the plurality of rolls of the chill section, the center axis lines of said each two adjacent mating rolls defining a geometric plane, each plane thus defined being rotatable in each case about one of the center axis lines during said adjustment operation of the rolls, thereby varying an angle between adjacent geometric planes, while being in a bellows type configuration, where the planes are folds capable of unfolding relative to each other while pulled open but being connected at respective edges.

* * * * *